United States Patent [19]

Buckreus

[11] Patent Number: 5,094,290
[45] Date of Patent: Mar. 10, 1992

[54] SEAL MEANS FOR PREVENTING FLOW OF HOT GASES THROUGH A GAP

[75] Inventor: Werner Buckreus, Gauting, Fed. Rep. of Germany

[73] Assignee: MTU Motoren-und Turbinen-Union GmbH, Munich, Fed. Rep. of Germany

[21] Appl. No.: 603,206

[22] Filed: Oct. 25, 1990

[30] Foreign Application Priority Data

Oct. 27, 1989 [DE] Fed. Rep. of Germany ....... 3935960

[51] Int. Cl.⁵ .............................. F28F 9/00; F28F 9/22
[52] U.S. Cl. ......................................... 165/83; 165/81; 277/12; 277/154; 277/199; 277/200
[58] Field of Search .................. 165/81, 83; 277/199, 277/200, 12, 154

[56] References Cited

U.S. PATENT DOCUMENTS

| | | | |
|---|---|---|---|
| 4,405,137 | 9/1983 | Webb | 277/199 |
| 4,586,564 | 5/1986 | Hagemeister | 165/81 |
| 4,679,619 | 7/1987 | Wohrl et al. | 165/81 |
| 4,735,260 | 4/1988 | Wohrl et al. | 165/81 |
| 4,781,388 | 11/1988 | Wohrl et al. | 165/81 |

FOREIGN PATENT DOCUMENTS 684164  3/1965  Italy ..................................... 165/83

Primary Examiner—Albert W. Davis, Jr.
Attorney, Agent, or Firm—Ladas & Parry

[57] ABSTRACT

A seal for a gap between two components which are displaceable relative to each other through limited distances in three spatial directions, the seal being formed by at least two partially overlapping corrugated, bellows-like seal elements which are arranged one after the other in the longitudinal direction of the gap. Each seal element is connected to one of the components at a fixed point of attachment and is slidably and guidably connected to both components. Adjacent seal elements can also be slidably and guidably connected to one another. The seal provides sealing action for comparatively large relative movements of the two components and, thus for greatly varying widths and shapes of the gap.

18 Claims, 3 Drawing Sheets

SEAL MEANS FOR PREVENTING FLOW OF HOT GASES THROUGH A GAP

FIELD OF THE INVENTION

This invention relates to a seal for preventing flow of hot gases through a gap between two components while permitting limited relative displacement of the components in three mutually perpendicular directions in space.

BACKGROUND

In sealing such gaps, for example, between a heat exchanger block and an outer housing of the heat exchanger, there is the problem that the stream of gas flowing through the heat exchanger block must not be allowed to partially bypass the block through gaps, despite the fact that thermally induced expansions and displacements occur and make conventional sealing difficult. One state-of-the-art solution involves the use of brush seals, although these are disadvantageous due to high manufacturing cost. Furthermore, they suffer from premature wear and display a certain amount of permeability to the gas stream.

SUMMARY OF THE INVENTION

An object of the present invention is to provide a seal means which, on the one hand, is simple in construction and which, on the other hand, ensures reliable sealing for considerable relative displacement between the components being sealed.

In accordance with the invention, the seal means serves for sealing a gap between two spaced components which are relatively displaceable in three directions in space, and the seal means comprises at least two seal elements extending longitudinally in the gap between the two spaced components, said seal elements partially overlapping one another in the longitudinal direction. Each of said seal elements is of corrugated, bellows-like shape with bends extending in the longitudinal direction, and each of the seal elements is fixedly connected at a respective point of attachment to one of said components and is guidably connected to both of said components for slidable movement at least in the longitudinal direction.

A major advantage afforded by the seal means of the invention is that the bellows-like slidably arranged seal elements permit relative movements between the two components in all three spatial directions without compromising the sealing action. In addition, the arrangement is simple and inexpensive to manufacture and if damaged, is readily repairable since each seal element can be individually replaced. Compared to brush seals, it permits a greater amount of relative movement to be achieved between the moving components.

In one embodiment of the present invention each seal element has parallel walls between the bends. This gives maximum flexibility in the direction of corrugation. In a preferred arrangement, the parallel walls are oriented at an inclination with respect to a longitudinal plane through the gap. This arrangement is advantageous when the direction of relative movement between the two components is known. In this case the seal element is designed such that the parallel walls extend substantially perpendicular to a line joining the components in their final position after the relative movement, so that considerable flexibility of the seal element can be provided for this position.

In a further preferred embodiment of the present invention the point of attachment of a seal element to a component is formed as a threaded connection with said component. This permits easy replacement of defective seal elements.

The point of attachment is preferably arranged in the region of one of the ends of each seal element. This permits one of the two extreme edges of a seal element to be defined and fixed regardless of the effect of thermal expansion.

In a further advantageous embodiment of the present invention, the means for guidably connecting each seal element to a respective component comprises a pin and slot connection. This arrangement is advantageously very easy to manufacture by simply punching a slot or hole into the sheet metal of the seal element. The pin advantageously is in the form of a shoulder bolt which is threaded into one of the components to be sealed and whose shoulder abuts against the component. The shoulder has a diameter corresponding to the diameter of the hole in one seal element and the width of the slot in the other seal element to achieve fixation of the one seal element and movability of the other seal element in one direction.

The corrugated seal elements preferably have between 1 and 10 bends depending on the amount of differential expansion relative to the width of the gap to be accommodated. Preferably, 4 to 6 bends are provided.

In a further preferred embodiment of the present invention for an L-shaped seal gap between the two relatively movable components, a first seal element serves to seal one leg of the L-shaped gap while a second seal element laterally abuts against the first seal element and seals the other leg of the gap. This arrangement which advantageously seals gaps having right-angle bends, eliminates the need to provide specially designed seal elements for the corner regions. In this arrangement the first seal element is preferably attached to the outer component in the corner region, and the second seal element is attached in the corner region to the inner component. This permits the remaining gaps between the seal elements and the components to be minimized in the presence of major thermal expansions.

The material for the seal elements is adapted to suit the area of application, and high-temperature iron or nickel-base alloys can advantageously be used for sealing the gaps in heat exchangers. However, nonmetallic materials, such as ceramics or plastics, can also be used.

DETAILED DESCRIPTION OF PREFERRED EMBODIMENTS

Figure 1:
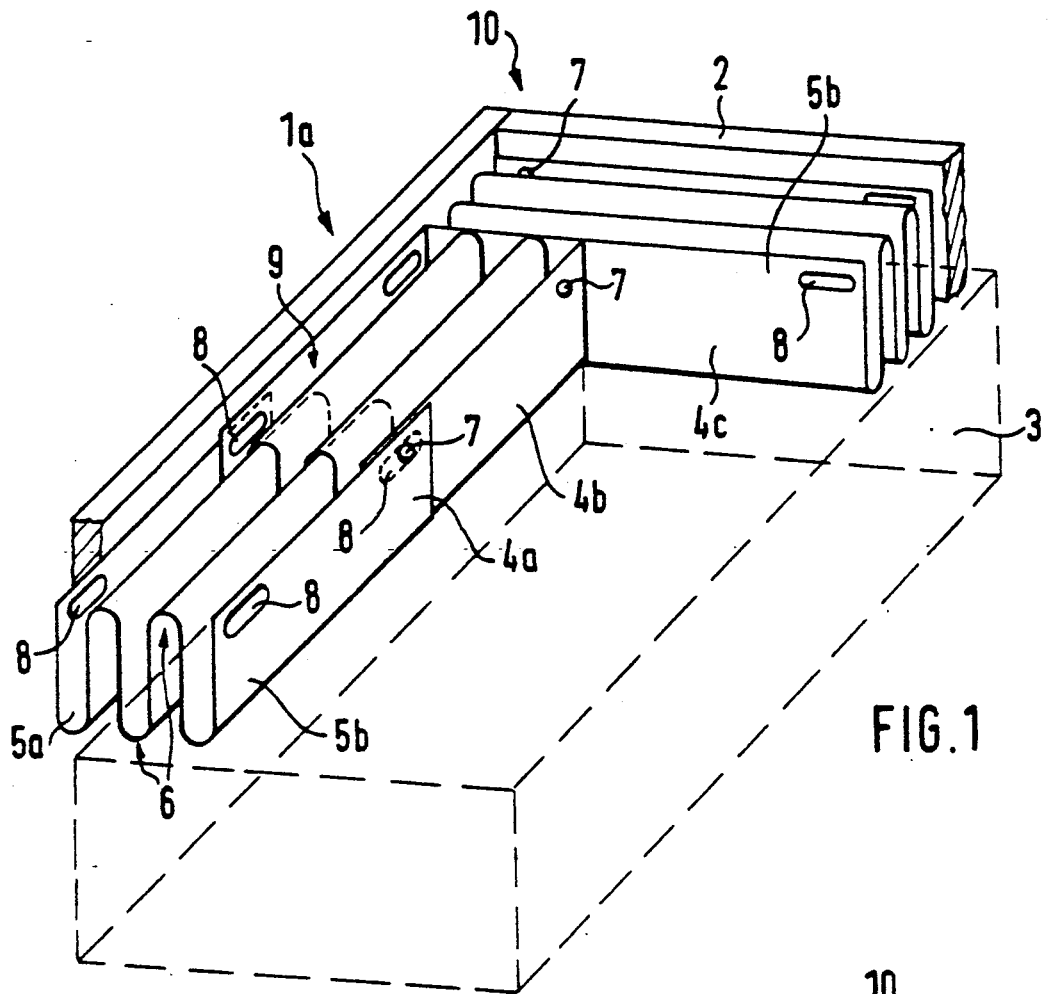
FIG. 1 is an oblique view illustrating an angular seal arrangement according to the invention.

With reference now to FIG. 1 a seal 1a seals an L-shaped gap between an outer component 2 and an inner component 3 (shown in dotted outline). The components 2 and 3 confront one another and are relatively movable in three directions in space. The seal 1a consists of a plurality of partially overlapping, corrugated bellows-like seal elements 4a. In this arrangement if the two components, 2 and 3, undergo relative movement in all three spatial directions, the L-shaped gap changes in shape and width.

The bellows-like seal elements 4a have two opposite wall sections 5a, 5b which extend parallel to the components 2, 3, and arranged between the wall sections are 1 to 10 bends 6. The bends 6 and the wall sections 5a, 5b extend longitudinally in parallel, in the gap. The wall sections 5a, 5b are connected by connection means (to be described more fully later) to the components 2, 3, with a fixed point of attachment 7 and with a number of sliding attachment means 8. The point of attachment 7 is preferably formed by a rivet or bolt secured in a hole in the seal element 4a (to be described in detail later). The sliding attachment means 8 is formed by a pin and slot connection in which the pin is preferably secured to one of the components 2, 3 and is slidable in a slot in the seal element 4a. Successive seal elements in the gap partially overlap one another in a region 9. At the corner 10 of the L-shaped gap a seal element 4c extends in one leg of the L-shaped gap and one of its ends abuts against outer component 2, while the seal in the other leg of the L-shaped gap comprises a seal element 4b having one end abutting against the wall section 5b of seal element 4c.

The points of attachment 7 are preferably located in the region of one of the ends of the respective seal element to minimize thermal expansion between the end and the point of attachment, whereas thermal expansion between the point of attachment 7 and the other end of the seal element poses negligible problems since the sliding attachment means 8 at this end allows the seal element to undergo displacement relative to the point of attachment 7 in the longitudinal direction of the gap.

Figure 4:
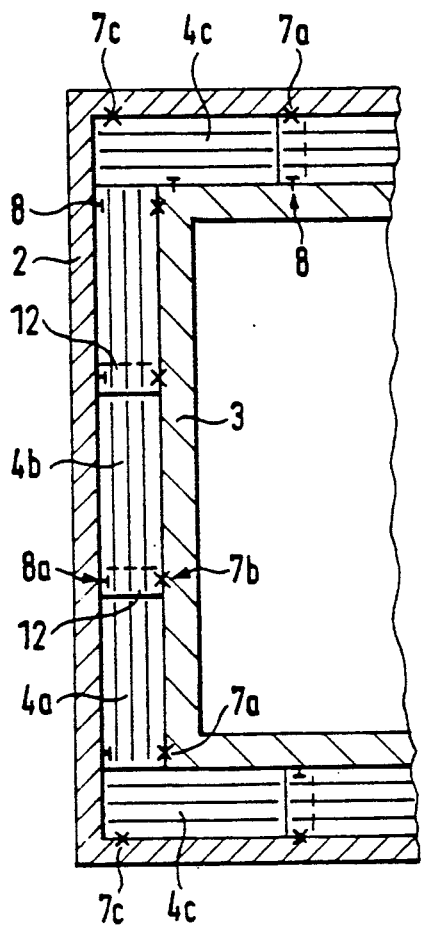
FIG. 4 is a sectional view of a portion of two spaced components with a seal arrangement in the gap therebetween.

The point of attachment 7 of one seal element, for example, seal element 4a in FIG. 4 and one of the sliding attachment means 8 of the adjacent seal element 4b are preferably juxtaposed such that the fixing element, e.g., a rivet also serves as a guide means in the sliding attachment means 8 of the seal element 4b. Hence, as seen in FIG. 1, at the right end of seal element 4a, the pin 7 at attachment means 8 secures the wall section 5b to component 3 and is slidably mounted in the slot of means 8 of adjacent seal element 4b to permit slidable movement of seal element 4b longitudinally of the gap. Each seal element is thus secured at one corner to a component while its other three corners are slidably connected to adjacent overlapping seal elements.

Figure 2:
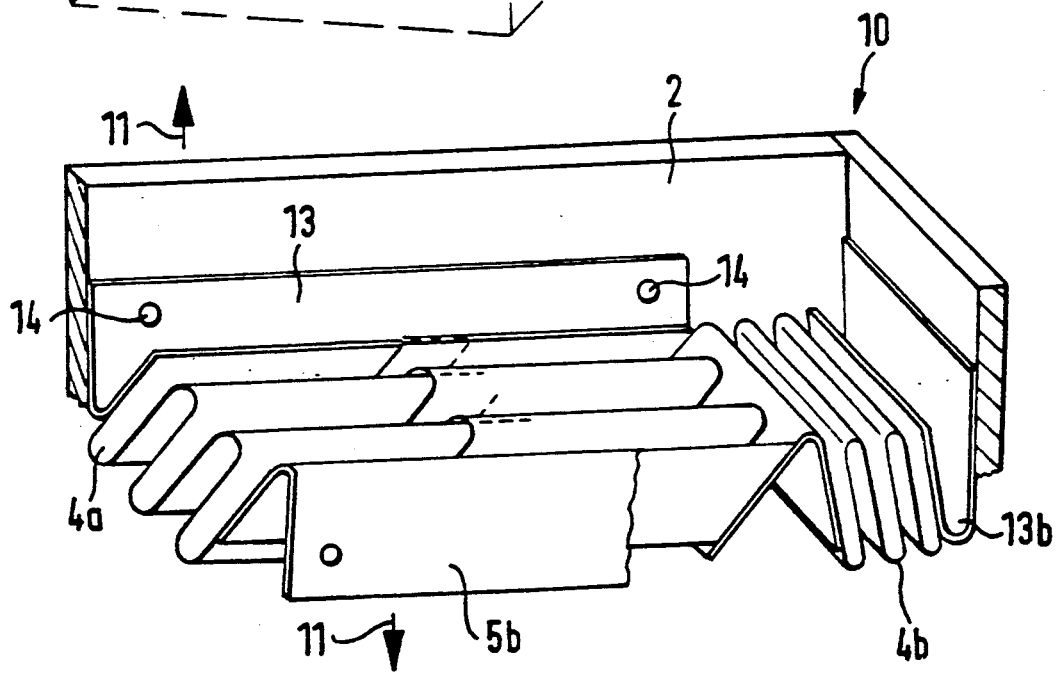
FIG. 2 is an oblique view illustrating an alternative seal arrangement.

The embodiment illustrated in FIG. 2 differs from that in FIG. 1 in that the parallel wall elements of each seal element connecting the bends are inclined with respect to end wall sections 5a, 5b and with a longitudinal plane passing through the gap. This embodiment is employed when the direction of thermally induced relative movement of the two components 2, 3 is in a vertical direction as indicated by arrows 11, so that the bellows-like seal elements elastically return to their initial position of rest as shown in FIG. 2, when the relative movement is completed. The arrows 11 in FIG. 2 represent a thermally induced relative displacement between the components 2, 3 in a vertical direction, relative to which the corrugations of the seal element are inclined. See also FIG. 3b.

In this arrangement, the seal element is attached to an angle strip 13 which is secured to the outer component 2 by attaching means 14. The seal element 4b is similarly attached to the component 2 through an angle strip 13b.

Illustrated in FIG. 4 is a U-shaped gap formed between components 2 and 3 and sealed by a plurality of seal elements 4a, 4b and 4c as shown in FIGS. 1 and 2. Dotted lines 12 indicate the region where two adjacent seal elements overlap. The points of attachment 7 are represented by "X", at which each seal element is fixedly connected at one point to one of the components 2, 3. The sliding attachment means 8 are given a T-shape and each seal element preferably has three sliding attachment means 8 connecting the seal element with adjacent seal elements.

The points of attachment 7c of seal elements 4c in the corner regions of the U-shaped gap are positioned in close proximity to the corner of the outer component 2 to minimize any spaces between the end edges of the seal elements 4c and the outer component 2 regardless of thermal expansion.

The point of attachment 7a of seal element 4a is arranged at the corner of the inner component 3 to minimize the formation of a space between the abutting seal elements 4a, 4c, regardless of temperature differences. The point of attachment 7b of the seal element 4b is simultaneously incorporated into the sliding attachment means of the adjacent seal element 4a, whereas the sliding attachment means 8a simultaneously ensures guidance of seal element 4a as well as adjacent seal element 4b.

Figure 3B:
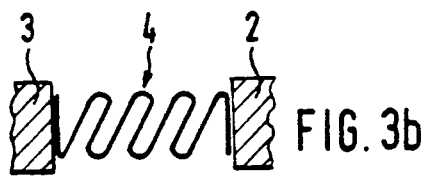
FIG. 3b is a schematic sectional view of the seal element in FIG. 3a at a different temperature.
Figure 3A:
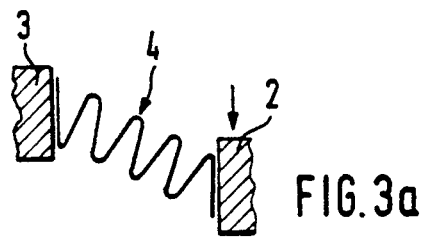
FIG. 3a is a schematic sectional view of a seal element.

Schematically illustrated in sectional view in FIG. 3a is the embodiment of FIG. 2, with the two components 2 and 3 displaced vertically and horizontally relative to each other. In FIG. 3b components 2 and 3 are relatively displaced horizontally, for example, by thermal expansion from hot gases in a large heat exchanger. In this position the bellows-like seal element is relaxed and exhibits its maximum resilience. This substantially increases its life under critical thermal loads, since allowable bending stresses are higher at low temperatures.

The seal of the present invention is particularly useful at extremely low temperatures in refrigeration equipment.

Figure 5:
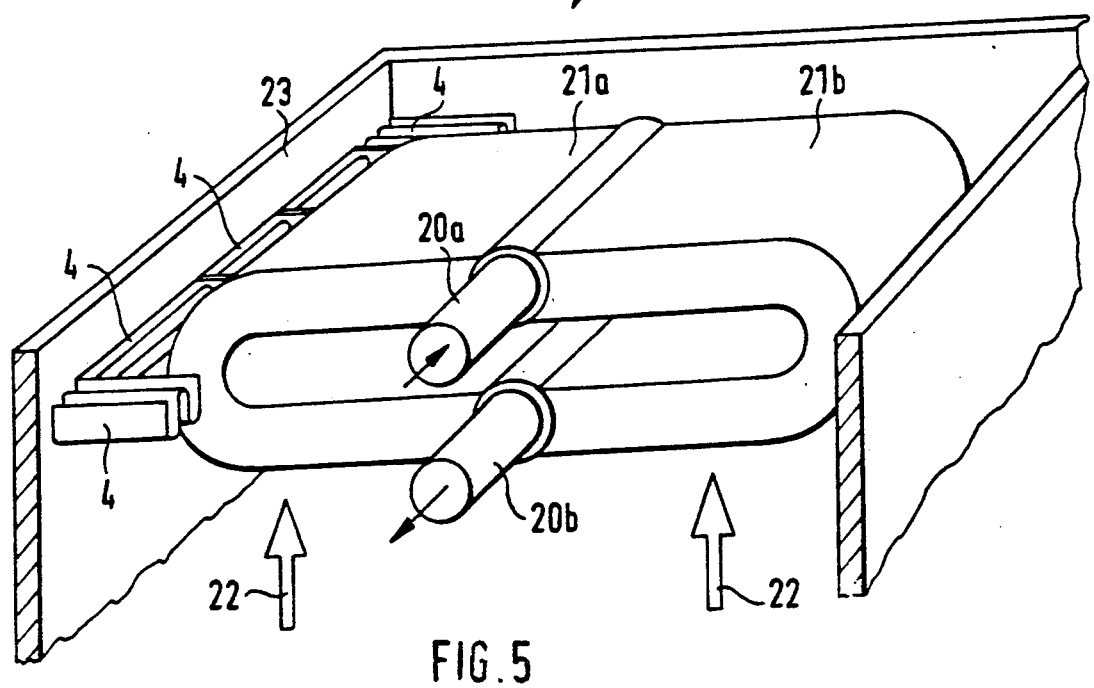
FIG. 5 is a schematic oblique view of a heat exchanger.

FIG. 5 illustrates one application of the seal of the invention in a conventional cross-counterflow heat exchanger 19 essentially comprising two parallel manifolds 20a, 20b interconnected through two U-shaped tube matrices 21a, 21b. Each tube matrix comprises rows and columns of heat exchange tubes, and fluid to be heated flows into manifold 20a, then through the tubes of the matrices where the fluid is heated by hot gases 22 flowing around the heat exchange tubes whereafter the now heated fluid flows to manifold 20b for external discharge to a utilization means (not shown).

The fluid to be heated, can be, for example, compressed air. The stream of hot gases 22 flows through and around the heat exchange tubes of tube matrices 21a, 21b in a cross-counterflow relation relative to the fluid in the heat exchange tubes. The stream of hot gases 22 is ducted through a rectangular housing 23. The seal elements 4 of the invention are arranged in the gap between the tube matrices 21a, 21b and the wall of housing 23 to prevent the stream of hot gases from bypassing the tube matrices 21a, 21b.

The hot gases impinging on the outer surfaces of the heat exchange tubes of the tube matrices cause the tube matrices 21a, 21b to expand in their axial direction to decrease the gap with the housing wall 23. At the same time the surfaces of the heat exchange tubes of the tube matrices facing the incoming stream of hot gases 22 will heat up faster at the bottom, where the temperature is higher, than on the top causing the bend regions of the heat exchange tubes to displace in the direction of flow of hot gases 22. It is because of this thermally induced displacement that the seal elements illustrated in FIGS. 1 and 2 are especially adapted for sealing the gap.

Figure 6:
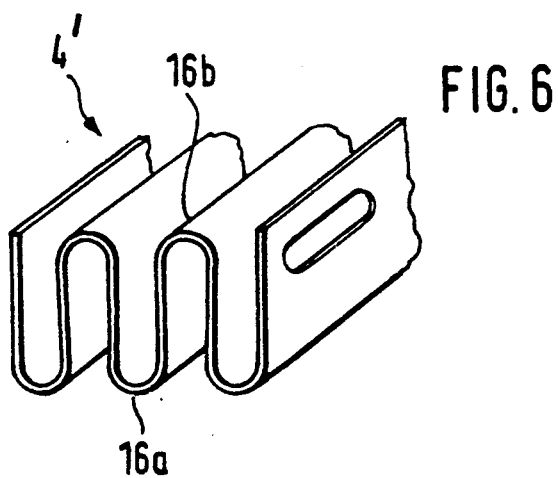
FIG. 6 is a schematic oblique view of a modified seal arrangement.

FIG. 6 illustrates an embodiment of the seal element 4' which comprises two juxtaposed layers 16a, 16b. This gives the seal element greater stiffness and increases the spring travel. This arrangement is well-suited especially when the width of the gap (cf. FIG. 4) is relatively small while the pressure on both sides of the seal element 4' is relatively high. Each of the layers 16a, 16b preferably consists of metal sheet 0.2 mm thick of Fe or Ni based alloy.

Figure 7A:
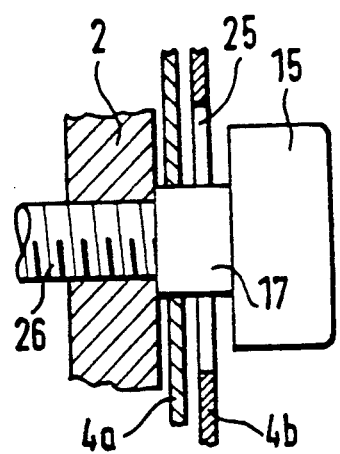
FIG. 7a is a sectional view illustrating a seal element attachment means, FIG. 7b diagrammatically illustrates two adjacent seal members joined by the attachment means of FIG. 7a, FIG. 8 is a sectional view of a further seal element attachment means.
Figure 7B:
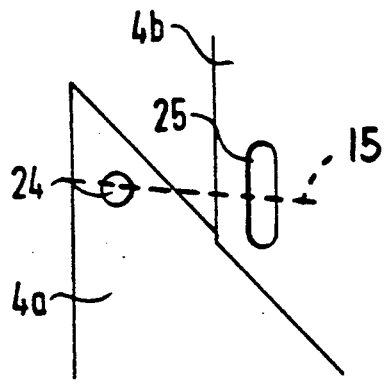

FIG. 7a illustrates one embodiment of an attaching element 15 which serves for fixedly connecting one seal element 4a to a respective component while simultaneously slidably retaining the adjacent seal element 4b. The attaching element 15 comprises a bolt with a shoulder 17 whose outer diameter corresponds to the diameter of a hole 24 in seal element 4a and to the width of a slot 25 in seal element 4b. In this arrangement the threaded end 26 of bolt 15 fixedly engages in component 2. The seal elements 4a, 4b, retain a limited amount of relative movability to compensate for pressure and temperature-induced expansions and contractions.

Figure 8:
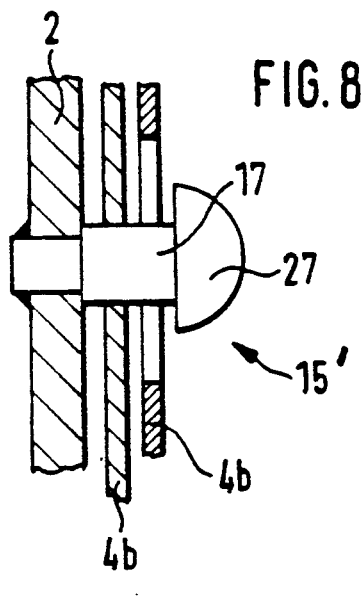

FIG. 8 illustrates an alternative embodiment 15' of the attaching element in the form of a pin 27 welded to the component 2. The pin has a shoulder 27 in an arrangement similar to the shoulder 17 in FIG. 7a.

Figure 9:
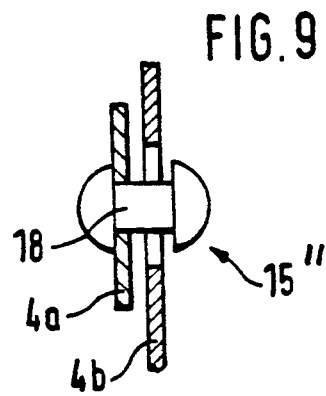
FIG. 9 is a sectional view of still another seal element attachment means.

FIG. 9 illustrates a further embodiment of the retaining element 15" in the form of a rivet 18 interconnecting the two seal elements 4a, 4b with some amount of float along the shank of the rivet, so that no fixed connection is provided at this point to either of the components.

Although the invention has been described with reference to particular embodiments, it will become apparent to those skilled in the art that numerous modifications and variations can be made within the scope and spirit of the invention as defined in the attached claims.

What is claimed is:

1. Seal means for sealing a gap between two spaced components which are relatively displaceable in three directions in space, said seal means comprising at least two seal elements extending longitudinally in the gap between two spaced components, said seal elements partially overlapping one another in the longitudinal direction, said seal elements each being of corrugated, bellows-like shape with bends extending in the longitudinal direction, means fixedly connecting each of the seal elements at a respective point of attachment to one of said components and means guidably connecting each seal element to both said components for slidable movement at least in the longitudinal direction.

2. Seal means as claimed in claim 1, wherein each corrugated seal element includes a plurality of parallel wall elements connected together by said bends.

3. Seal means as claimed in claim 2, wherein said parallel wall elements are inclined with respect to a longitudinal plane passing through said gap.

4. Seal means as claimed in claim 1, wherein said means which fixedly connects each seal element to one of said components comprises a member fixed to said seal element and including means fixedly connected to said one component comprising a threaded connection, a spot welded connection or a riveted connection.

5. Seal means as claimed in claim 1, wherein each of said seal elements has opposite ends and said point of attachment of each said element to one of said components is in the region of one of said ends.

6. Seal means as claimed in claim 1, wherein said means for guidably connecting each seal element to both components comprises a pin and slot connection between the seal element and a respective component.

7. Seal means as claimed in claim 1, wherein each seal element comprises 1 to 10 bends.

8. Seal means as claimed in claim 1, wherein said components are of L-shape and are arranged as inner and outer components to define an L-shape gap which has legs meeting at a corner, said seal elements being arranged as a first unit in one of the legs of the L-shaped gap and a second unit in one of the legs of the L-shaped gap and a second unit in the other of the legs of the L-shaped gap, an end seal element of one unit abutting against one component whereas an end seal element of the other unit abuts against said end seal element of said one unit.

9. Seal means as claimed in claim 8, wherein said end seal element of said one unit has one said point of attachment to said outer component in the region of said corner, said end seal element of said other unit having one said point of attachment to said inner component in the region of said corner.

10. Seal means as claimed in claim 1, wherein said spaced components are constituted respectively by a tube matrix of a heat exchanger and an outer shell surrounding the tube matrix.

11. Seal means as claimed in claim 1, wherein each seal element comprises a high temperature Fe or Ni base alloy.

12. Seal means as claimed in claim 1, wherein each seal element comprises two juxtaposed layers of material.

13. Seal means as claimed in claim 1, wherein said means which fixedly connects each seal element to one of said components and said means which guidably connects each seal element to both components collectively comprise, where said seal elements overlap one another, a pin secured to said one component and to one of said overlapped seal elements and a slot in the other of the overlapped seal elements slidably receiving said pin.

14. Seal means as claimed in claim 13, wherein said pin includes a collar on which said one of said overlapped seal elements is fixedly secured, said collar being slidable in said slot.

15. Seal means as claimed in claim 14, wherein said pin further comprises means extending from said collar for fixed attachment to said one component.

16. Seal means as claimed in claim 15, wherein said means extending from said collar includes a threaded portion threadably engaged with said one component.

17. Seal means as claimed in claim 15, wherein said means extending from said collar includes a rivet head.

18. Seal means as claimed in claim 15, wherein said means extending from said collar includes means comprising a weld between said one component and said pin.

* * * * *